United States Patent
Herrmann et al.

(10) Patent No.: US 8,113,311 B2
(45) Date of Patent: Feb. 14, 2012

(54) CHASSIS FOR A BATTERY-OPERATED INDUSTRIAL TRUCK

(75) Inventors: Udo Herrmann, Johannesberg (DE);
Arne Eckhoff, Aschaffenburg (DE);
Michael Harsche, Grossostheim (DE);
Daniel Just, Kronau (DE); Marc Reinbott, Bodenheim (DE)

(73) Assignee: Linde Material Handling GmbH, Aschaffenburg (DE)

( * ) Notice: Subject to any disclaimer, the term of this patent is extended or adjusted under 35 U.S.C. 154(b) by 381 days.

(21) Appl. No.: 12/354,929

(22) Filed: Jan. 16, 2009

(65) Prior Publication Data

US 2009/0200837 A1    Aug. 13, 2009

(30) Foreign Application Priority Data

Feb. 8, 2008    (DE) .................. 10 2008 008 146

(51) Int. Cl.
*B60R 16/04*    (2006.01)
(52) U.S. Cl. ...................... 180/68.5; 180/311
(58) Field of Classification Search .............. 180/68.5, 180/311; 280/783; 429/159; *B60R 16/04*
See application file for complete search history.

(56) References Cited

U.S. PATENT DOCUMENTS

| | | | | |
|---|---|---|---|---|
| 3,367,441 A * | 2/1968 | Schuster et al. | ............. | 180/68.5 |
| 3,497,090 A * | 2/1970 | Daniels | .......................... | 414/347 |
| 3,704,761 A * | 12/1972 | Barrett, Jr. | .................... | 180/68.5 |
| 3,821,997 A * | 7/1974 | Sieren | .......................... | 180/68.5 |
| 4,173,264 A * | 11/1979 | Erker et al. | .................. | 180/68.5 |
| 4,496,274 A * | 1/1985 | Pipes | .......................... | 414/340 |
| 4,711,467 A * | 12/1987 | Link et al. | ..................... | 280/785 |
| 4,779,692 A * | 10/1988 | Hagarty et al. | ............. | 180/68.5 |
| 4,834,424 A * | 5/1989 | Link | ............................. | 280/785 |
| 4,898,419 A * | 2/1990 | Kenmochi et al. | ........... | 296/204 |
| 5,114,207 A * | 5/1992 | Nakajima et al. | ........... | 296/204 |
| 5,228,531 A * | 7/1993 | Patterson et al. | ........... | 180/68.5 |
| 5,297,645 A * | 3/1994 | Eckersley et al. | ........... | 180/68.5 |
| 5,346,786 A * | 9/1994 | Hodgetts | ....................... | 429/159 |
| 5,454,597 A * | 10/1995 | Thomas et al. | ............... | 280/789 |
| 5,593,167 A * | 1/1997 | Barnhardt et al. | ......... | 280/164.1 |
| 5,709,280 A * | 1/1998 | Beckley et al. | .............. | 180/68.5 |
| 5,893,468 A * | 4/1999 | Holmes | ........................ | 211/60.1 |
| 6,029,762 A * | 2/2000 | Kepner | ........................ | 180/65.1 |
| 6,102,356 A * | 8/2000 | Huntley et al. | .............. | 248/500 |
| 6,173,799 B1* | 1/2001 | Miyazaki et al. | ............ | 180/19.3 |
| 6,189,636 B1* | 2/2001 | Kikukawa | .................... | 180/68.5 |
| 6,474,429 B1* | 11/2002 | Nishio | .......................... | 180/68.5 |
| 6,475,659 B1* | 11/2002 | Heimer | ........................... | 429/66 |
| 6,528,899 B1* | 3/2003 | Saito et al. | ................... | 307/10.1 |

(Continued)

FOREIGN PATENT DOCUMENTS

DE    103 42 659 A1    4/2005

*Primary Examiner* — J. Allen Shriver, II
*Assistant Examiner* — James Triggs
(74) *Attorney, Agent, or Firm* — The Webb Law Firm

(57) ABSTRACT

A chassis for a battery-operated industrial truck has a center chassis section (1) configured to hold a battery block. The center chassis section (1) is open on top, has a forward transverse wall (5), a rear transverse wall (6), an open side wall (7) provided with a lateral battery compartment opening (B), and a closed side wall (8) which is at a distance from the open side wall (7) in the transverse direction of the chassis. The center chassis section (1) has a chassis bottom (9) in the form of a rigid and torsion-resistant hollow body.

13 Claims, 4 Drawing Sheets

U.S. PATENT DOCUMENTS

| | | | |
|---|---|---|---|
| 6,732,825 B2 * | 5/2004 | Takeda | 180/68.5 |
| 6,973,986 B2 * | 12/2005 | Murase | 180/68.5 |
| 7,128,179 B2 * | 10/2006 | Szymanski | 180/68.5 |
| 7,246,846 B2 * | 7/2007 | Shioji et al. | 296/190.11 |
| 7,249,645 B2 | 7/2007 | Herrmann et al. | |
| 7,374,004 B2 * | 5/2008 | Kraimer et al. | 180/68.5 |
| 7,543,666 B2 * | 6/2009 | Connelly et al. | 180/68.5 |
| 7,641,013 B2 * | 1/2010 | Kim et al. | 180/68.5 |
| 7,694,766 B2 * | 4/2010 | Gotz et al. | 180/68.1 |
| 7,712,563 B2 * | 5/2010 | Niebuhr | 180/68.5 |
| 7,726,427 B2 * | 6/2010 | Picavet | 180/68.5 |
| 7,757,798 B2 * | 7/2010 | Niemeier | 180/89.1 |
| 7,770,525 B2 * | 8/2010 | Kumar et al. | 105/51 |
| 2002/0017407 A1 * | 2/2002 | Takeda | 180/68.5 |
| 2002/0185320 A1 * | 12/2002 | Murase | 180/68.5 |
| 2007/0154259 A1 * | 7/2007 | Pendleton et al. | 404/25 |
| 2007/0175846 A1 * | 8/2007 | Konstant | 211/189 |
| 2007/0269712 A1 * | 11/2007 | Ju | 429/97 |
| 2008/0115990 A1 * | 5/2008 | Jung et al. | 180/68.5 |

* cited by examiner

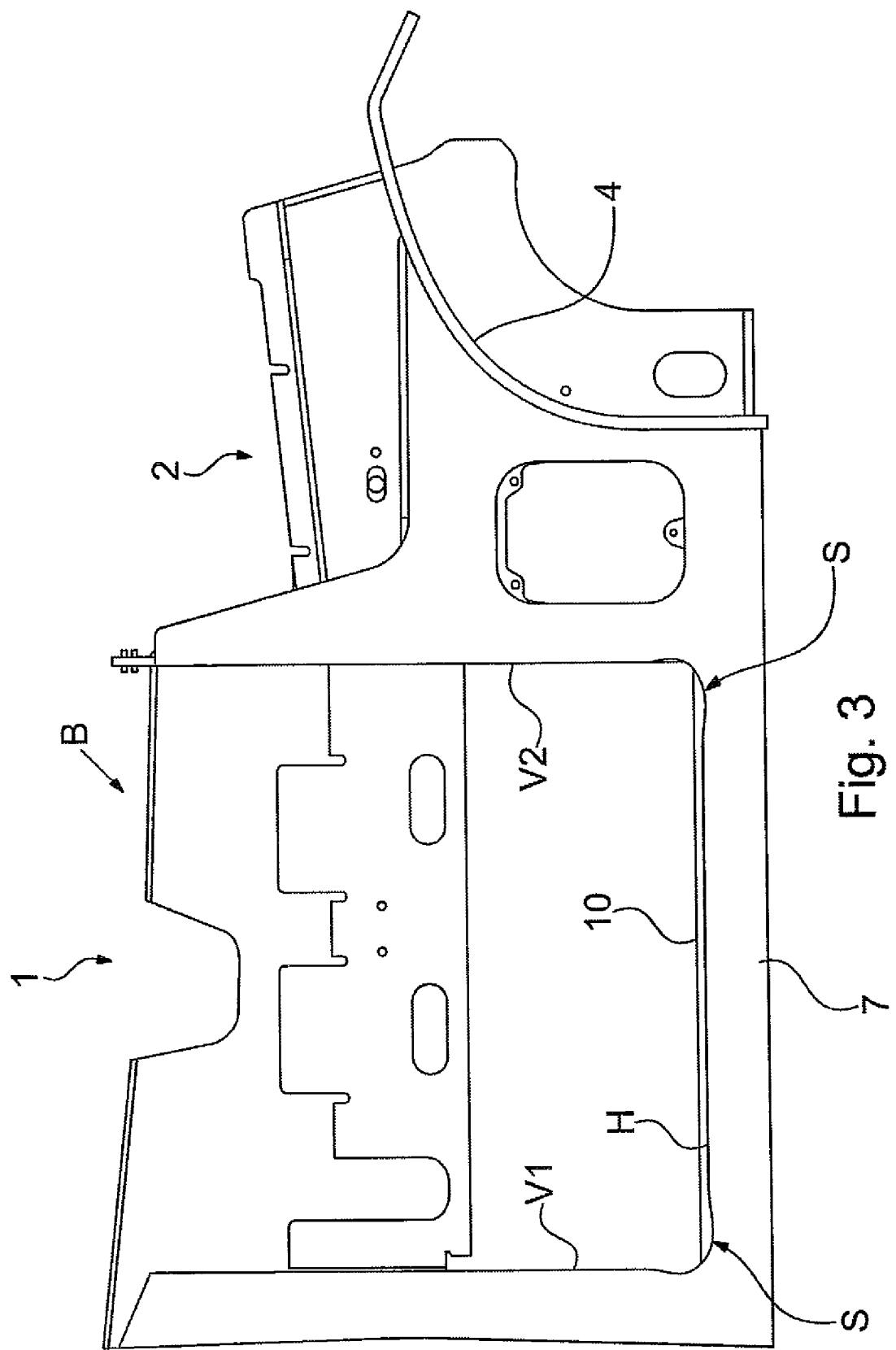

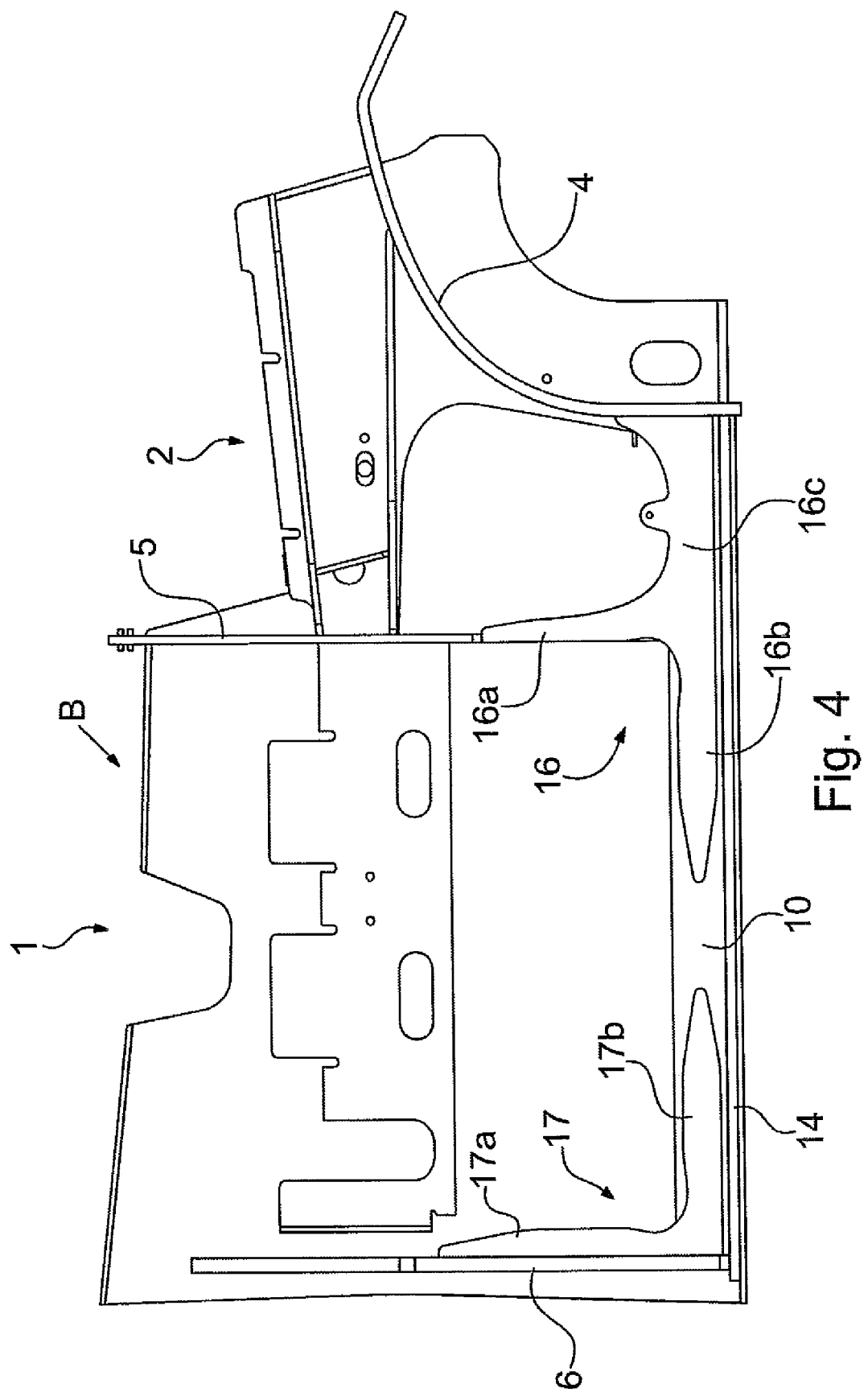

CHASSIS FOR A BATTERY-OPERATED INDUSTRIAL TRUCK

CROSS REFERENCE TO RELATED APPLICATION

This application claims priority to German application DE 10 2008 008 146.9, filed Feb. 8, 2008, which is herein incorporated by reference in its entirety.

BACKGROUND OF THE INVENTION

1. Field of the Invention

This invention relates to a chassis for a battery-operated industrial truck. The chassis has a center chassis section that is configured to hold a battery block and is open on top, has a forward transverse wall, a rear transverse wall, an open side wall provided with a lateral battery compartment opening (B), and a closed side wall (8) which is at a distance from the open side wall (7) in the transverse direction of the chassis.

2. Technical Considerations

An industrial truck chassis is described in DE 103 42 659 A1. On this chassis, to reinforce the chassis, a battery door is provided on the open side wall with which the battery compartment opening can be closed and which, when the door is closed, can absorb tension, compression and torsion forces. The battery door thereby forms an integral, force-transmitting component of the frame.

If the battery is replaced using a process that requires a second industrial truck which must drive close to the battery compartment opening to remove the battery, it is necessary to open the battery door by 180 degrees. For this purpose, a battery door with a double hinge is provided on an industrial truck having a chassis of the type described above. Together with the function of the battery door of reinforcing the chassis, which requires not only a stable configuration of the door panel but also of the hinge and interlocking components, the result is a significant expense in terms of design and construction.

Therefore, it is an object of this invention to provide a chassis of the general type described above but which achieves a high degree rigidity with low design and construction costs and, therefore, makes a chassis-reinforcing battery door unnecessary.

SUMMARY OF THE INVENTION

The invention teaches that the central chassis section has a chassis floor which is in the form of a rigid and torsion-resistant hollow body.

In one aspect of the invention, the loss of rigidity of the chassis caused by the battery compartment opening is compensated for by a construction of the chassis floor which can withstand the application of a high load. The chassis of the invention, which connects the forward transverse wall and the rear transverse wall with the closed side wall and the open side wall, does not require any complex battery door that reinforces the chassis. As a result, the chassis components that are subject to play and thus to wear are no longer necessary. In addition, the battery replacement process is also simplified and can be performed in a shorter time.

In one advantageous embodiment of the invention, the chassis floor has a framework structure which includes a plurality of horizontally oriented braces.

It is advantageous if the framework structure has a first longitudinal brace located in the vicinity of the open side wall and a second longitudinal brace located in the vicinity of the closed side wall. The longitudinal braces are connected with each other by at least one diagonal brace and extend through the forward transverse wall into a forward section of the chassis where they are anchored.

This construction leads to relatively low design and construction costs with an extraordinarily high rigidity both of the chassis floor of the central chassis section that supports the battery as well as of the total chassis structure. The forces to be absorbed, in particular the bending forces to be absorbed by the longitudinal braces, are thereby distributed over the chassis and are also transmitted into components of the forward chassis section. Simultaneously, only a few braces are required for this advantageous construction in the framework structure of the chassis floor which is in the form of a hollow body.

A high degree of stability of the chassis floor of the chassis of the invention also results from the fact that the diagonal brace (viewed from overhead) is located with a rear end in the vicinity of the intersection of the open side wall and the rear transverse wall and with a forward end in the vicinity of the intersection of the closed side wall and the forward transverse wall.

If at least a portion of the braces are in the form of a hollow profile rod or bar (e.g., a rod or bar with a tubular profile) that has a closed cross-section, the result is both a high stability and load-bearing capacity of these components as well as a relatively simple manufacturing process. At the same time, the invention does not exclude the possible use of other profiles, e.g., bent or compound profiles, i.e., connected profiles, such as profiles in the shape of a C or a U, for example.

In one advantageous embodiment of the invention, the hollow body (i.e., chassis floor) has a floor plate which is located underneath the framework structure and at least one cover plate which is located in the upper portion of the framework structure.

In this case, the cover plate can include two triangular-shaped individual plates, each of which connects one of the longitudinal braces with the diagonal brace.

It is also advantageous if in the vicinity of the battery compartment opening, at the transition from the forward vertical boundary to the horizontal boundary, a forward L-shaped corner element is located between the first longitudinal brace and the open side wall. This corner element can have a vertical leg which is connected with the side wall and a horizontal leg which is connected with the first longitudinal brace.

Analogously, it is advantageous if, in the vicinity of the battery compartment opening at the transition from the rear vertical boundary to the horizontal vertical boundary, a rear L-shaped corner element is located between the first longitudinal brace and the open side wall. This corner element has a vertical leg which is connected with the rear transverse wall and a horizontal leg which is connected with the first longitudinal brace.

The L-shaped corner elements are used to reinforce the bottom corners of the battery compartment opening.

To avoid the notch stresses in the corners, the invention teaches that the open side wall, in the transition from the vertical boundaries to the horizontal boundary of the battery opening, has an undercut and the corner elements are each provided in the transition between the vertical leg and the horizontal leg with a contour that is congruent with the undercuts of the open side wall. This arrangement also prevents the battery from digging its way into the corners during insertion and removal.

The upper edge of the horizontal leg of the corner elements and the horizontal boundary of the battery compartment opening are preferably congruent and are, therefore, below the upper boundary of the longitudinal braces of the framework structure. The battery block, which is located in the central chassis section, is, therefore, supported exclusively on the highly stable framework structure.

In one advantageous embodiment of the invention, to achieve an anchoring of the two longitudinal braces that is as strong and rigid as possible in the forward chassis section, the first longitudinal brace is connected in the vicinity of the forward chassis section at least with an extension of the horizontal leg of the forward L-shaped corner element and the second longitudinal brace is connected at least with the closed side wall.

Additional advantages and details of the invention are explained in greater detail below on the basis of the exemplary embodiment illustrated in the accompanying schematic figures.

BRIEF DESCRIPTION OF THE DRAWINGS

FIG. 3 is a side view of the chassis of FIG. 1 in the direction of the battery compartment opening; and FIG. 4 is a side view similar to FIG. 3 but with the open side wall removed.

DESCRIPTION OF THE PREFERRED EMBODIMENTS

The chassis of the invention is well suited for an industrial truck powered by an electric battery, such as a front-seat, counterweighted fork-lift truck. For this purpose, the chassis has a center chassis section 1 which is open on top and is configured to hold a block-shaped battery. Nevertheless, the invention does not exclude the possible use, instead of a battery block, of a propulsion unit of a hybrid propulsion system, for example, such as an internal combustion engine with a generator and battery, or a fuel cell, any of which propulsion systems can also be located in the center chassis section 1.

Figure 1:
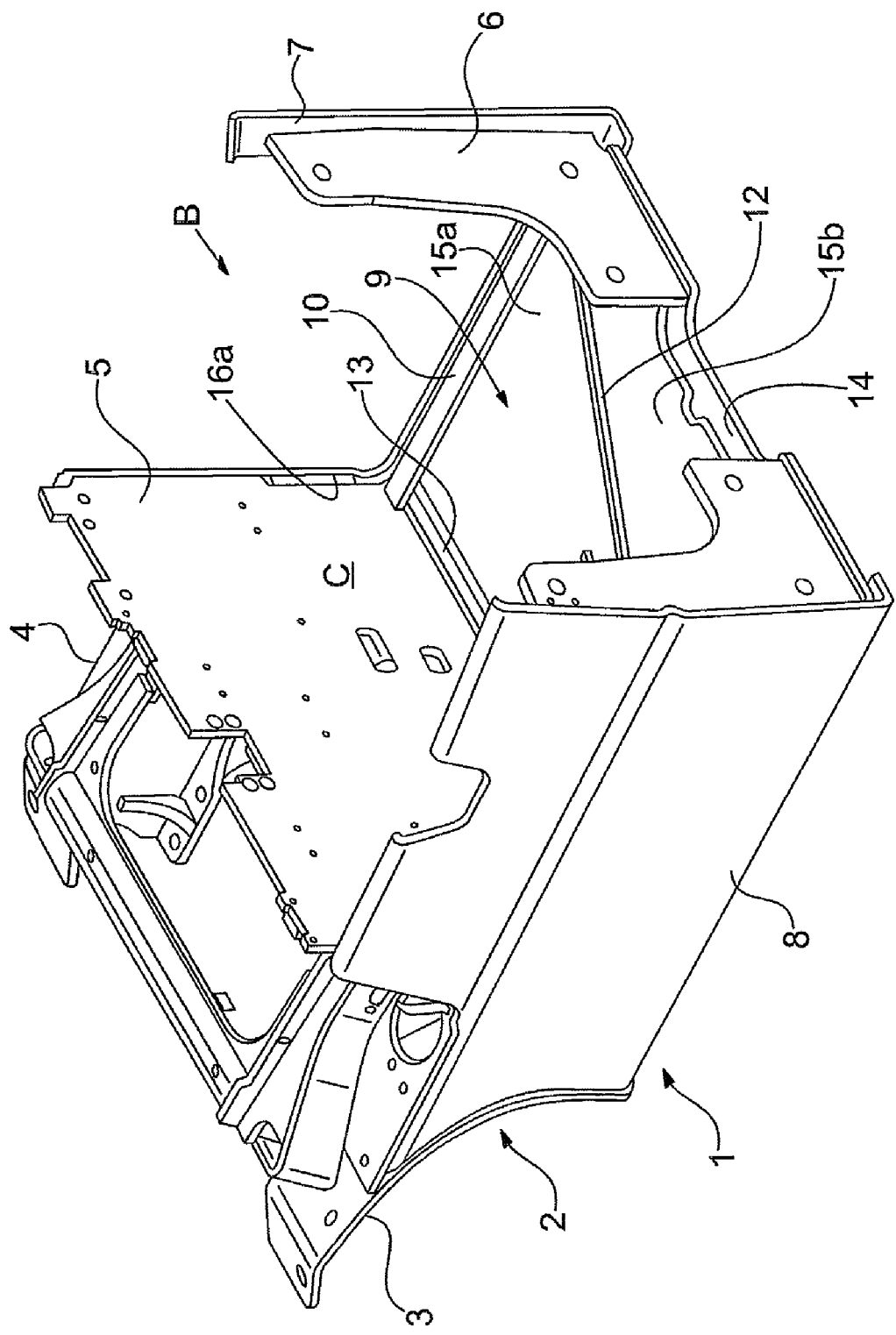
FIG. 1 is a perspective view of a chassis incorporating the features of the invention.

Adjacent to the center chassis section 1, which is shown from the rear in FIG. 1, and forward of the center chassis section 1 is a forward chassis section 2, which also comprises fenders 3, 4 which are realized in the form of load-bearing elements. A drive axle and a lifting platform (not shown) are fastened to the forward chassis section 2.

The center chassis section 1 has a forward transverse wall 5 and a rear transverse wall 6 which, in this exemplary embodiment, is divided vertically into two parts. The two transverse walls 5, 6 are connected to each other by two side walls 7, 8 which extend in the longitudinal direction of the chassis. The space enclosed by the transverse walls 5, 6 and the side walls 7, 8 forms a battery compartment. The battery can be inserted into the battery compartment from above, and can be removed for recharging and replaced with another charged battery. To make it possible to change the battery from the side, the side wall 7 is provided with a battery compartment opening B. The side wall 7 with the battery opening B is, therefore, an open side wall, while on the other hand the side wall 8, which is at some distance from the side wall 7 in the transverse direction of the chassis, represents a closed side wall.

Adjacent to the rear end of the central chassis section 1 is a counterweight (not shown) which is bolted to the two-part transverse wall 6 and performs a load-bearing function (i.e., fastening of the rear axle which is realized in the form of a steering axle). The chassis, therefore, consists of the forward and the center chassis section and the counterweight. Only after the counterweight is bolted to the two-part transverse wall 6 does the latter form a solid and uninterrupted transverse wall, as a result of which the chassis is stabilized in the transverse direction of the vehicle.

Figure 2:
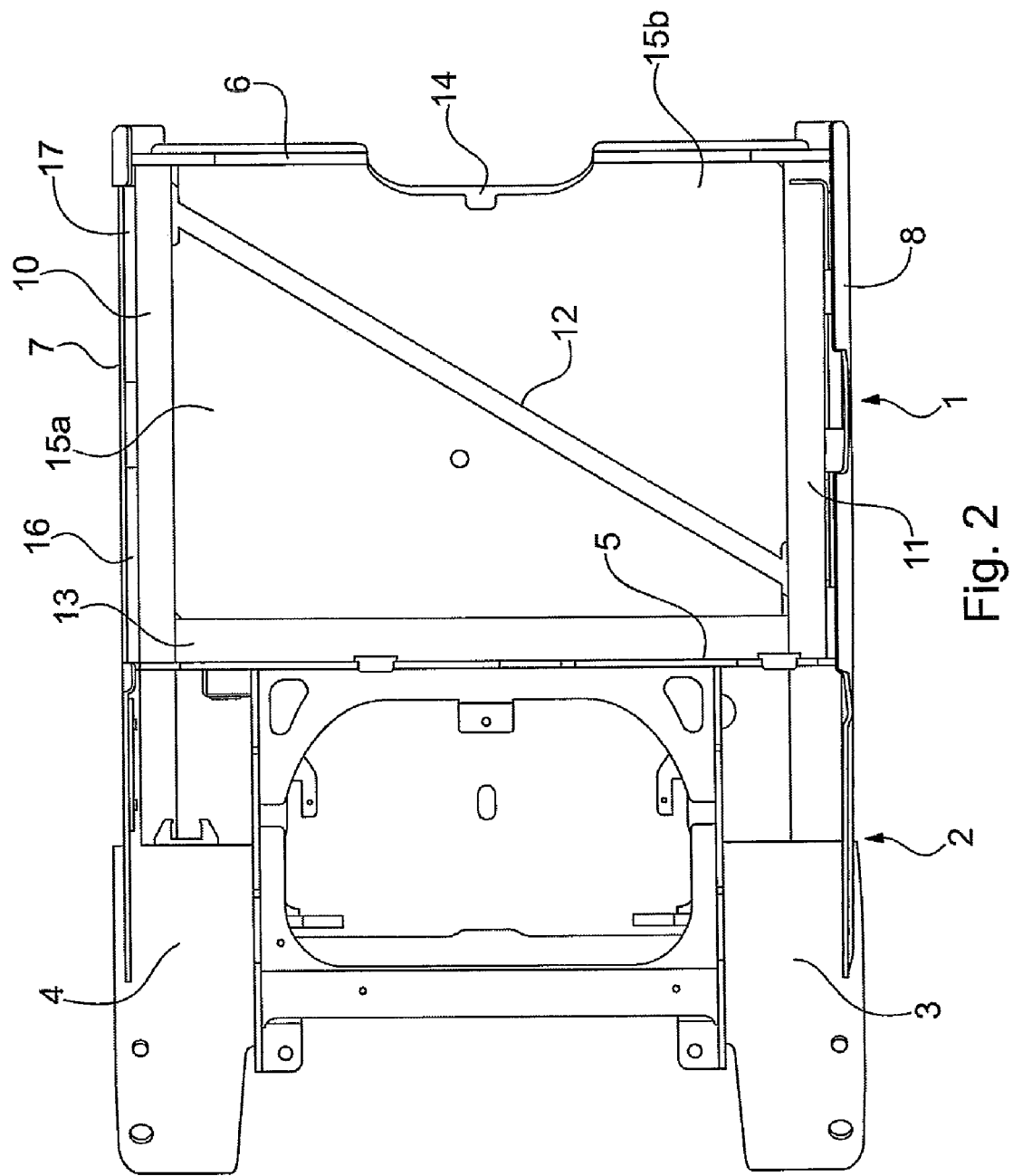
FIG. 2 is a plan view of the chassis of FIG. 1.

The battery compartment in the central chassis section 1 is bounded on the bottom by a chassis floor 9 which is in the form of a hollow body which connects the transverse walls 5, 6 and the side walls 7, 8 to one another on their lower ends. The chassis floor 9 has a framework structure with horizontal braces. There is a first longitudinal brace 10 in the vicinity of the open side wall and a second longitudinal brace 11 in the vicinity of the closed side wall 8 (See FIG. 2). The two longitudinal braces 10, 11 extend through the forward transverse wall 5 to the fenders 3, 4 in the forward chassis section 2 where they are anchored in place, such as by welding.

The two longitudinal braces 10, 11 are connected to each other by a diagonal brace 12. In this case, the diagonal brace 12 (viewed from overhead) is located with a rear end in the vicinity of the intersection of the open side wall 7 and the rear transverse wall 6, and with a front end in the vicinity of the intersection of the closed side wall 8 and the forward transverse wall 5. The framework structure is also supplemented by a cross brace 13 which is oriented parallel to the forward transverse wall 5 and is connected to it, and which connects the two longitudinal braces 10, 11 with each other. Additional braces can also be present.

The braces of the framework structure, but at least the longitudinal braces 10, 11, are preferably in the form of hollow profile bars that have a closed cross-section (in particular in the form of a tubular profile). Closed cross-sections can also be represented by a combination of appropriate C-shaped and U-shaped profiles. It is also conceivable to use open profiles, although they are less stable at the same dimensions.

Adjacent to the framework structure on the bottom is a floor plate 14 which is welded to the braces. In the upper portion of the framework structure, two triangular cover plates 15a, 15b are provided. The cover plate 15a connects the longitudinal brace 10 with the diagonal brace 12 and the cover plate 15b connects the longitudinal brace 11 with the diagonal brace 12 (e.g., by welded connections). The cover plates 15a, 15b are thereby not flush with the upper boundary of the longitudinal braces 10, 11 but lie slightly below them.

Overall, the result is a sandwich construction of the chassis floor 9, whereby the longitudinal braces 10, 11 form continuous connections from the counterweight to the fenders 3, 4 and above all absorb the bending loads. The diagonal brace 12 (as well as the cross brace 13) and the floor plate 14 connected with the framework structure, as well as the cover plates 15a, 15b provide a high degree of torsional rigidity around the longitudinal axis of the vehicle.

As shown in the side view in FIG. 3, the open side wall 7, which covers both the central frame section 1 as well as the forward frame section 2 up to the fenders, has an undercut S in the transition from the vertical boundaries V1, V2 to the horizontal boundary 11 of the battery compartment opening B. Therefore, there are no sharp-edged corners. As a result, the material load is reduced (i.e., reduced notch effect). The horizontal boundary H of the battery compartment opening B is below the top boundary of the braces of the framework structure.

FIG. 4 shows that behind the side wall 7, i.e., between the longitudinal brace 10 and the side wall 7, in the vicinity of the battery compartment opening B at the transition from the forward vertical boundary V2 to the horizontal boundary H, there is a forward L-shaped corner element 16, which has a vertical leg 16a which is connected with the side wall 7 and a horizontal leg 16b which is connected with the first longitudinal brace 10. The corner element 16 also has an extension 16c, in the form of an elongation of the horizontal leg 16b, which extends into the forward chassis section 2 to the fender 4 and is fastened both to the longitudinal brace 10 which is connected with the floor plate 14 and to the side wall 7. Therefore, the first longitudinal brace 10 is fastened indirectly to the side wall 7 in the vicinity of the forward chassis section 2.

Analogously, in the vicinity of the battery compartment opening, at the transition from the rear vertical boundary V1 to the horizontal boundary H, there is a rear L-shaped corner element 17 which has a vertical leg 17a which is connected with the rear transverse wall 6 and a horizontal leg 17b which is connected with the longitudinal brace 10.

The corner elements 16, 17 which are used to reinforce the corners of the battery compartment opening B, each have, in the transitional area between the vertical leg 16a or 17a and the respective horizontal leg 16b or 17b, a contour which is congruent with the undercut S of the side wall 7 to reduce notch stresses in this area. The upper edge of the horizontal leg 16b and 17b is congruent with the horizontal boundary H of the battery compartment opening B and is, therefore, below the top boundary of the longitudinal braces of the framework structure.

The second longitudinal brace 11 which is located in the vicinity of the rear side wall 8 extends, analogously to the first longitudinal brace 10, through the forward transverse wall 5 to the fender 3 and is connected to the bottom wall 14 and the side wall 8 (welded connection).

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A chassis for a battery-operated industrial truck, comprising:
a central chassis section configured to hold a battery block, wherein the central chassis section has an opening on top, a forward transverse wall, a rear transverse wall, an open side wall provided with a lateral battery compartment opening, and a closed side wall spaced from the open side wall in a transverse direction of the chassis, and wherein the central chassis section has a chassis floor comprising at least one cover plate and a floor plate spaced below the at least one cover plate to define a rigid and torsion-resistant hollow body.

2. The chassis of claim 1, wherein the chassis floor has a framework structure comprising a plurality of horizontally oriented braces.

3. The chassis of claim 2, wherein the framework structure comprises a first longitudinal brace located in a vicinity of the open side wall and a second longitudinal brace located in a vicinity of the closed side wall, and wherein the first and second longitudinal braces are connected to each other by at least one diagonal brace and extend through the forward transverse wall into a forward chassis section where they are anchored.

4. The chassis of claim 3, wherein the diagonal brace viewed from overhead has a rear end in a vicinity of an intersection of the open side wall and the rear transverse wall and a forward end in a vicinity of an intersection of the closed side wall and the forward transverse wall.

5. The chassis of claim 2, wherein at least some of the braces comprise a hollow profile bar that has a closed cross-section.

6. The chassis of claim 3, wherein the floor plate is located below the framework structure and the at least one cover plate is positioned in a top portion of the framework structure.

7. The chassis of claim 6, further comprising two triangular-shaped cover plates, each of which connects one of the longitudinal braces with the diagonal brace.

8. The chassis of claim 3, wherein in the vicinity of the battery compartment opening at a transition from a forward vertical boundary to a horizontal boundary, a forward L-shaped corner element is located between the first longitudinal brace and the open side wall, the forward L-shaped corner element having a vertical leg connected with the side wall and a horizontal leg connected with the first longitudinal brace.

9. The chassis of claim 3, wherein in the vicinity of the battery compartment opening at a transition from a rear vertical boundary to a horizontal boundary, a rear L-shaped corner element is located between the first longitudinal brace and the open side wall, which rear L-shaped corner element has a vertical leg connected with the rear transverse wall and a horizontal leg connected with the first longitudinal brace.

10. The chassis of claim 8, wherein in the vicinity of the battery compartment opening at a transition from a rear vertical boundary to a horizontal boundary, a rear L-shaped corner element is located between the first longitudinal brace and the open side wall, which rear L-shaped corner element has a vertical leg connected with the rear transverse wall and a horizontal leg connected with the first longitudinal brace.

11. The chassis of claim 10, wherein the open side wall, in the transition from the vertical boundaries to the horizontal boundary of the battery compartment opening, has an undercut and the corner elements are each provided, in the transition between the vertical leg and the horizontal leg with a contour which is congruent with the undercuts of the open side wall.

12. The chassis of claim 11, wherein an upper edge of the horizontal leg of the corner elements and the horizontal boundary of the battery compartment opening are congruent and are located below the upper boundary of the longitudinal braces.

13. The chassis of claim 12, wherein in the vicinity of the forward chassis section, the first longitudinal brace is connected at least with an extension of the horizontal leg of the forward L-shaped corner element and the second longitudinal brace is connected at least with the closed side wall.

* * * * *